(12) United States Patent
Burgess et al.

(10) Patent No.: US 7,535,887 B1
(45) Date of Patent: May 19, 2009

(54) PACKETIZING TELECOMMUNICATIONS SWITCH

(75) Inventors: Paul Norman Burgess, Wheaton, IL (US); Brian Scott Lien, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2160 days.

(21) Appl. No.: 09/597,430

(22) Filed: Jun. 20, 2000

(51) Int. Cl.
*H04L 12/66* (2006.01)
*H04M 11/00* (2006.01)

(52) U.S. Cl. .................. 370/352; 370/356; 370/476; 379/93.32

(58) Field of Classification Search .......... 370/351, 370/352–356, 357, 578, 433, 311, 389, 376, 370/375, 428, 395, 412, 378, 398; 375/222, 375/257, 200; 379/93.09, 93.12, 93.32; 455/574, 455/557, 343, 426.2; 358/434, 435, 436, 358/438, 439, 425, 468
See application file for complete search history.

(56) References Cited

U.S. PATENT DOCUMENTS

| | | | |
|---|---|---|---|
| 5,513,212 A * | 4/1996 | Bremer | 375/222 |
| 5,841,842 A * | 11/1998 | Baum et al. | 379/93.32 |
| 5,953,647 A * | 9/1999 | Patel et al. | 455/426.2 |
| 6,167,043 A * | 12/2000 | Frantz | 370/356 |
| 6,236,653 B1 * | 5/2001 | Dalton et al. | 370/352 |
| 6,330,251 B1 * | 12/2001 | O'Loughlin et al. | 370/476 |
| 6,349,133 B1 * | 2/2002 | Matthews et al. | 379/90.01 |
| 6,434,125 B1 * | 8/2002 | Marks et al. | 370/328 |
| 6,442,169 B1 * | 8/2002 | Lewis | 370/401 |
| 6,483,600 B1 * | 11/2002 | Schuster et al. | 358/1.15 |
| 6,512,764 B1 * | 1/2003 | Carew et al. | 370/356 |
| 6,603,757 B1 * | 8/2003 | Locascio | 370/352 |
| 6,711,160 B2 * | 3/2004 | Chan et al. | 370/354 |
| 2001/0043587 A1 * | 11/2001 | Fujino et al. | 370/352 |

* cited by examiner

*Primary Examiner*—Afsar M. Qureshi

(57) ABSTRACT

When receiving a telephone call, a telecommunications switch (150) analyzes the telephone call to determine if the telephone call includes a data transmission that complies with a predetermined data protocol. If the telephone call includes a data transmission that complies with a predetermined data protocol then a demodulator (212) demodulates the digital information signal contained in the data transmission. A data network interface (216) packetizes the digital information signal into a packet for transmission into a data network (118). Similarly, the data network interface (216) receives packets from a data network (118). The packets are converted into a data transmission for transfer over a telephone call to a device terminated by the telecommunications switch (150).

10 Claims, 3 Drawing Sheets

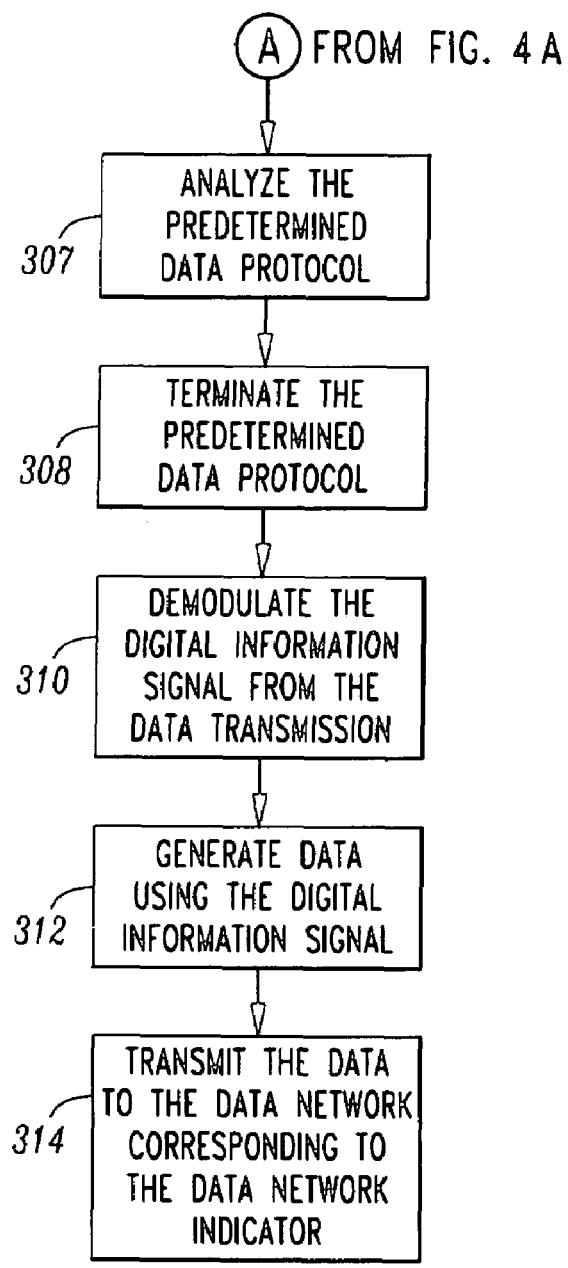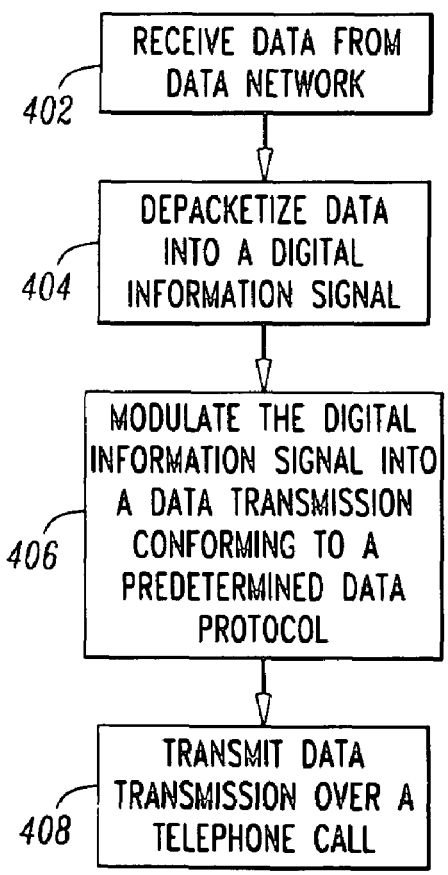

PACKETIZING TELECOMMUNICATIONS SWITCH

FIELD OF INVENTION

The invention relates generally to telecommunications switches, and in particular, to telecommunications switches terminating data communications equipment for transmission of data.

BACKGROUND OF THE INVENTION

When a data communications device, such as a computer, is used to communicate with another data communications device over a telephone network, the data communications devices use modems to facilitate the transmission. A modem, coupled to a transmitting data communication device, receives digital information from the transmitting data communication device and generates an analog signal that is transmitted over a telephone call over a telephone network. A modem coupled to the receiving data communications device on the other end of the telephone call receives the telephone call including the analog signal. The modem coupled to the receiving data communications device uses its modem to demodulate the digital information included in the analog signal in the telephone call for use by the receiving data communications device. For two-way communications, the receiving data communications device uses its modem to send data to the modem of the transmitting data communications device.

A telecommunications switch terminates the connection to the transmitting data communications device. That is, a telephone transmission facility, such as a line or trunk, is connected between the telecommunications switch and the modem coupled to the transmitting data communications device. The modem places telephone calls via the telephone line connected to the telecommunications switch. Similarly, the receiving data communications device is terminated at a telecommunications switch. That is, a telephone transmission facility, such as a line or trunk, is connected between the telecommunications switch and the modem coupled to the receiving data communications equipment. Although the telecommunications switch terminating the transmitting data communications device may be the same telecommunications switch terminating the receiving data communications device, it is likely that the telecommunications switches are different. In the case where the telecommunications switches are different, a connection for a telephone call is established between the two switches over a telephone network, where the connection may traverse several telecommunications switches and multiple lines and trunks. Even where the receiving and transmitting data communications equipment is terminated on the same telecommunications switch, a virtual circuit connection across a switch fabric is required for communications. The connection between the transmitting and receiving data communications devices is formed by a virtual circuit, which uses dedicated resources on each switch and trunk or line comprising the virtual circuit. The virtual circuit requires that the telecommunications switches devote resources and bandwidth to keep the connection active. However, the data transmissions between the transmitting and receiving data communications devices are typically sporadic, not always requiring all the dedicated bandwidth of the virtual circuit. Therefore, the dedication of a virtual circuit may waste valuable telecommunications resources.

Data networks do not typically require a dedicated connection between devices for communications. Packet transmission allows data communications devices to communicate over a data network by passing discrete chunks of data or packets over shared connections. Data networks alone, however, are not sufficiently available and compatible to provide the wide area communications achievable over the public switched telephone network. In particular, a typical computer user is not connected to a wide-area data network, but relies on the public switched telephone network to provide this connectivity. Large data communications users, such as Internet service providers, seek to reduce the distance between their data networks and servers and their users' computers. By reducing the distance between the data network and a user's computer, the number of telecommunications switches used for a virtual circuit is lowered, freeing up costly resources. One known method to reduce the distance between a data network and users' computers is to employ modem pools in an area in close proximity to a telecommunications switch. The modem pools receive circuit connections for telephone calls carrying data through the telecommunications switch. The modem pools terminate the modem protocols with the users' computers and concentrate the demodulated output from users into a data network. For two-way communications, input from the service provider's servers is received by the modem pool and modulated onto the appropriate circuit connections.

FIG. 1 shows such an arrangement where a modem 10 communicates with a server 20 via a modem pool 18. As shown in FIG. 1, access circuit 12 connects modem 10 to telecommunications switch 50 for placing and receiving telephone calls. Trunk circuit 16 connects modem pool 18 to telecommunications switch 50 for transmitting and receiving telephone calls. Even though modem 10 and modem pool 18 are terminated on the same telecommunications switch 50, a virtual circuit is required for data communications between these two devices. In particular, a virtual circuit is formed between access circuit 12 and the trunk circuit 16 via the switch fabric 14 of telecommunications switch 50.

Although, the modem pool solution alleviates some of the wasted resources required for a circuit connection for data communications, at least some resources through a circuit connection are still required and likely wasted. That is, the bandwidth of the virtual circuit is not fully utilized.

Therefore, a need exists for a system that reduces the amount of telecommunications resources required for transmitting and receiving a data transmission via a connection to a switched telephone network.

SUMMARY OF THE INVENTION

In accordance with one aspect of the present invention a method is provided for packetizing a data transmission using a telecommunications switch. The method is initiated upon the receipt of a telephone call by the telecommunications switch. After the telephone call is received, a determination is made as to whether the telephone call includes a data transmission conforming to a predetermined data protocol. The data protocol is, for example, a facsimile or modem data protocol. The data transmission includes a digital information signal. If the telephone call includes the data transmission, then the telecommunications switch terminates the predetermined data protocol. For example, for a modem protocol, the telecommunications switch provides signals simulating responses from a modem. The telecommunications switch demodulates the digital information signal from the data transmission, rather than propagating the data transmission through the telephone network. The digital information signal is then transmitted to its destination via a data network interface to a data network corresponding to the telephone call destination. The destination sends data to the device initiating the call using the data network. Data from the data network is received by the data network interface on the telecommunications switch. The data is modulated into a predetermined data protocol for transmission over the telephone call.

In another aspect of the present invention, an apparatus is provided for packetizing the digital information signal contained in a telephone call. The digital information signal is modulated in a data transmission conforming to a predetermined data protocol. The apparatus includes an access circuit for interfacing with customer premise equipment and receiving telephone calls from the customer premise equipment. A data protocol analyzer is coupled to the access circuit to determine whether a telephone call received via the access circuit includes a data transmission conforming to a predetermined data protocol. If the telephone call includes the data transmission, a demodulator is coupled to the access circuit to demodulate a digital information signal from the data transmission. A data network interface is coupled to the demodulator to receive the digital information signal and format the digital information signal for a data network corresponding to the destination of the telephone call.

For receiving communications from the data network, an apparatus is provided for generating a circuit transmission from the data packet received from a data network. The data packet received from the data network contains a digital information signal. The apparatus includes a data network interface to receive and format the data packet from the data network into a digital information signal. A modulator is coupled to the data network interface to modulate the digital information signal into a data transmission conforming to a predetermined data protocol. The access circuit is coupled to the modulator for interfacing with the customer premise equipment and a transmitting the data transmission to the customer premise equipment as a part of the telephone call.

BRIEF DESCRIPTION OF THE DRAWINGS

FIGS. 4A-B are flow charts illustrating a method of packetizing data for a data network in accordance with the present invention.

FIG. 5 is a flow chart illustrating a method of generating a circuit transmission from data received from a data network in accordance with the present invention.

DETAILED DESCRIPTION OF THE PREFERRED EMBODIMENTS

Figure 1:
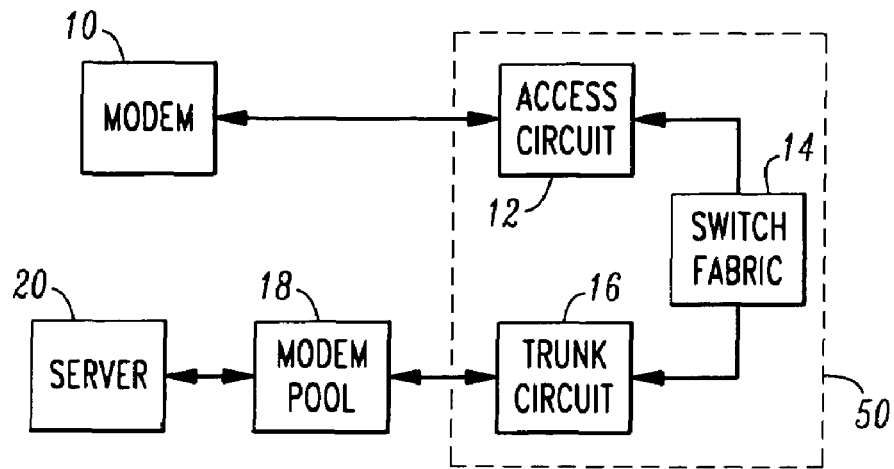
FIG. 1 is a block diagram of a prior art telecommunications network system, wherein modem pooling is employed for data communications.
Figure 2:
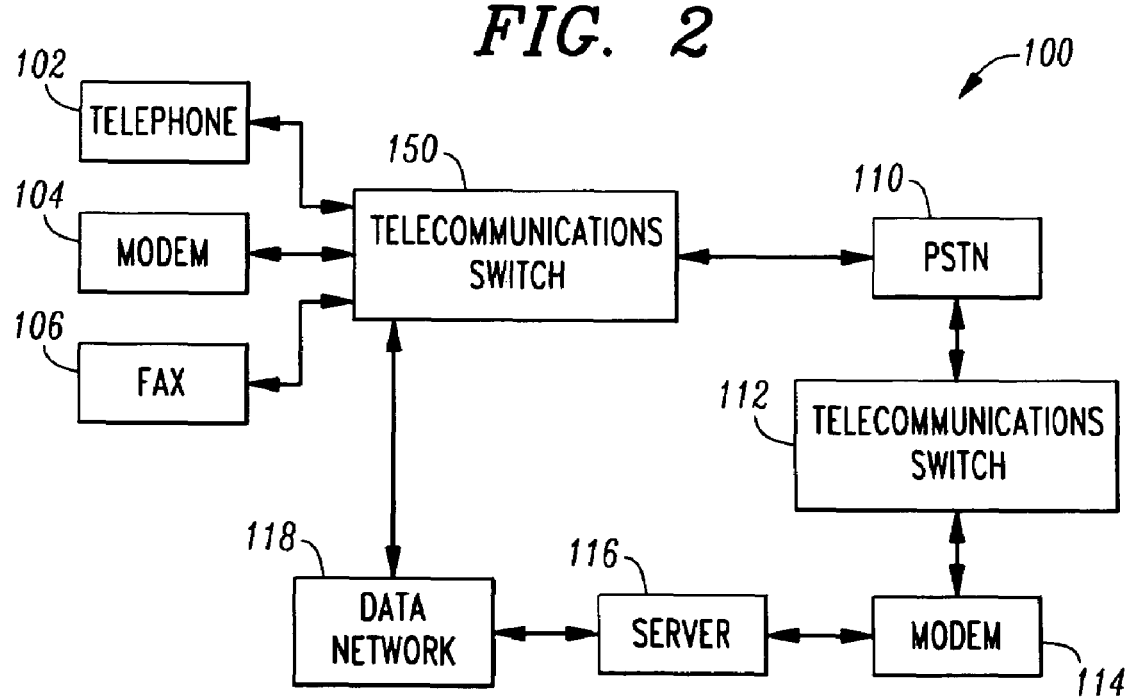
FIG. 2 is a block diagram of a telecommunications network system, including a telecommunications switch in accordance with the present invention.

FIG. 2 is a block diagram of a telecommunications network system 100 in accordance with the present invention. The telecommunications network system 100 includes a telecommunications switch 150, a public switched telephone network 110 (PSTN), a telecommunications switch 112, a modem 114, a server 116, and a data network 118. The telecommunications switch 150 interfaces customer premise equipment to the PSTN 110. As shown in FIG. 2, the customer premise equipment is, for example, a telephone 102, a modem 104, or a facsimile machine (fax machine) 106. Server 116 is also coupled to the PSTN 110 via the modem 114 and the telecommunications switch 112. In a typical data transmission, a user's computer that is coupled to modem 104 transmits data to and receives data from server 116 and modem 114 via the PSTN 110.

In accordance with the present invention, the telecommunications switch 150 provides an alternative pathway for a data transmission between the customer premise equipment terminated by switch 150 and another data communications device, for example, the server 116. The telecommunications switch 150 is coupled to a data network 118 that is directly connected to server 116. Preferably, the telecommunications switch 150 converts a telephone call containing a digital information signal into data packets conforming to a data network protocol. In this preferred embodiment, the data network 118 then transmits the data packets, including the digital information, to the server 116. For two-way communications, server 116 sends data over data network 118 to telecommunications switch 150. Telecommunications switch 150 receives the data and modulates the data for receipt by the customer premise equipment terminated on telecommunications switch 150.

Figure 3:
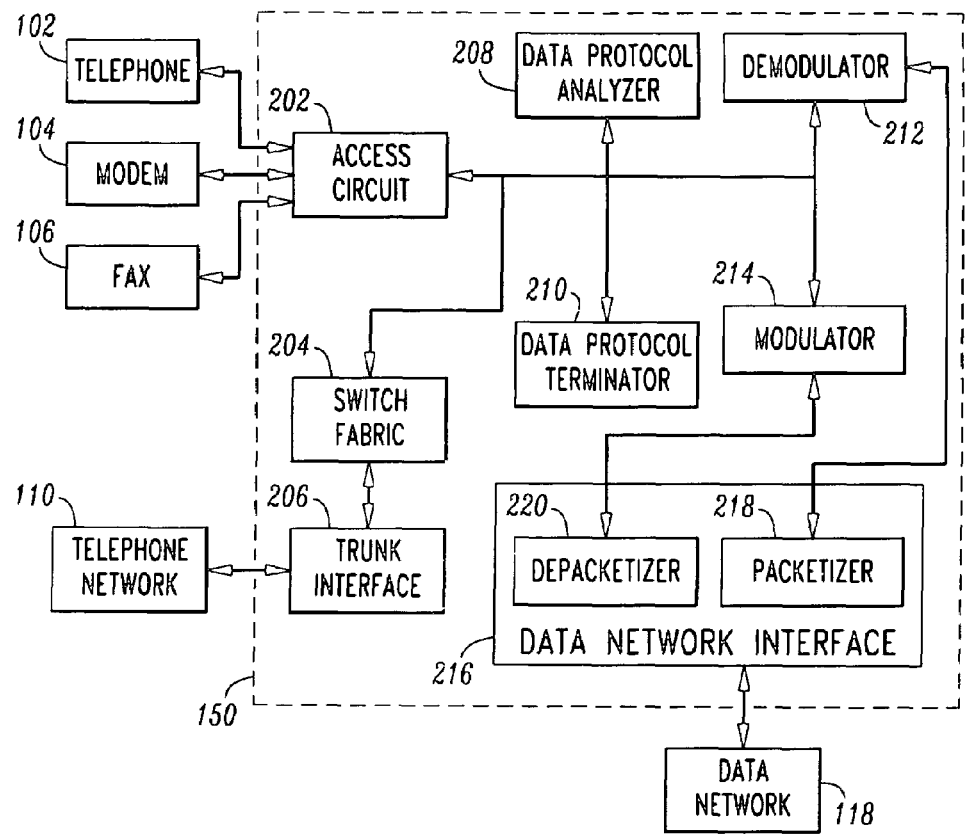
FIG. 3 is a block diagram of a preferred embodiment of a telecommunications switch in accordance with the present invention.

FIG. 3 is a block diagram of a preferred embodiment of telecommunications switch 150 in accordance with the present invention. The telecommunications switch 150 includes an access circuit 202, a switch fabric 204, and a trunk interface 206. Though one access circuit 202 and one trunk interface 204 are shown in FIG. 2, a plurality of access circuits and trunk interfaces are typically connected to switch fabric 204. Access circuit 202 couples customer premise equipment and the associated facilities to telecommunications switch 150 for placing and receiving telephone calls. Customer premise equipment is connected to switch 150 via lines. Trunk interface 206 couples switch 150 to telephone network 110. Typically, trunk interface 206 is connected via trunks to trunk interfaces on other telecommunications switches that comprise telephone network 110.

The telecommunications switch 150 also includes a data protocol analyzer 208, a data protocol terminator 210, a demodulator 212, and a data network interface 216. The data protocol analyzer 208, data protocol terminator 210, demodulator 212, and data network interface 216 provide an alternative pathway for data transmission between the customer premise equipment terminated by telecommunications switch 150 and another data communications device. Data protocol analyzer 208 is coupled to access circuit 202 to determine whether a telephone call for the access circuit 202 includes a data transmission conforming to a predetermined data protocol. Data protocol terminator 210 is coupled to the access circuit 202 to terminate the data protocol of a data transmission if the data protocol analyzer 208 determines the telephone call includes a data transmission conforming to a predetermined data protocol.

Demodulator 212 is coupled to the access circuit 202 to demodulate a digital information signal included in a data transmission received from access circuit 202. In the data transmission, the digital information signal is mixed or modulated onto a carrier signal. The demodulator 212 filters out or demodulates the carrier signal to obtain the digital information signal that is forwarded to the data network interface 216.

Data network interface 216 is coupled to the demodulator 212 to interface with data network 118. Data network interface 216 receives the digital information signal from the demodulator 212 and transmits the digital information signal to the data network 118. Preferably, data network interface 216 comprises a packetizer 218 to convert the digital information signal into a series of bits conforming to a data network protocol.

For two-way communications, the telecommunications switch 150 includes a modulator 214 that is coupled to the data network interface 216. The modulator 214 and data network interface 216 provide an alternative pathway for data communications from a data communications device to customer premise equipment terminated by telecommunications switch 150. Data network interface 216 preferably receives data packets from data network 118. The data packets are processed into a digital information signal for modulator 214. Most preferably, data network interface 216 includes a depacketizer 220 that unpacks or depacketizes data packets from data network 118 to form a digital information signal. Modulator 214 receives the digital information signal and modulates the signal into a data transmission that is sent to access circuit 202 for transmission during a telephone call with the customer premise equipment.

Data protocol analyzer 208, data protocol terminator 210, demodulator 212, and modulator 214 are preferably one or more, or the same, digital signal processors with stored programs to implement the specified functions. Most preferably, the access circuit 202 has a digital signal processor for voice packetization that is reused to implement the specified functions of data protocol analyzer 208, data protocol terminator 210, demodulator 212, and modulator 214. Alternatively, data protocol analyzer 208, data protocol terminator 210, demodulator 212, and modulator 214 are implemented with microprocessors, combinatorial logic, sequential logic, or a combination of these with appropriate interface circuits. Data network interface 216, including packetizer 218 and depacketizer 220, is preferably one or more microprocessors with stored programs to implement the specified functions. Alternatively, data network interface 216 is implemented with combinational logic, sequential logic, or a combination of these. Data network interface 216 includes interface circuits for connection to data network 118.

Figure 4A:
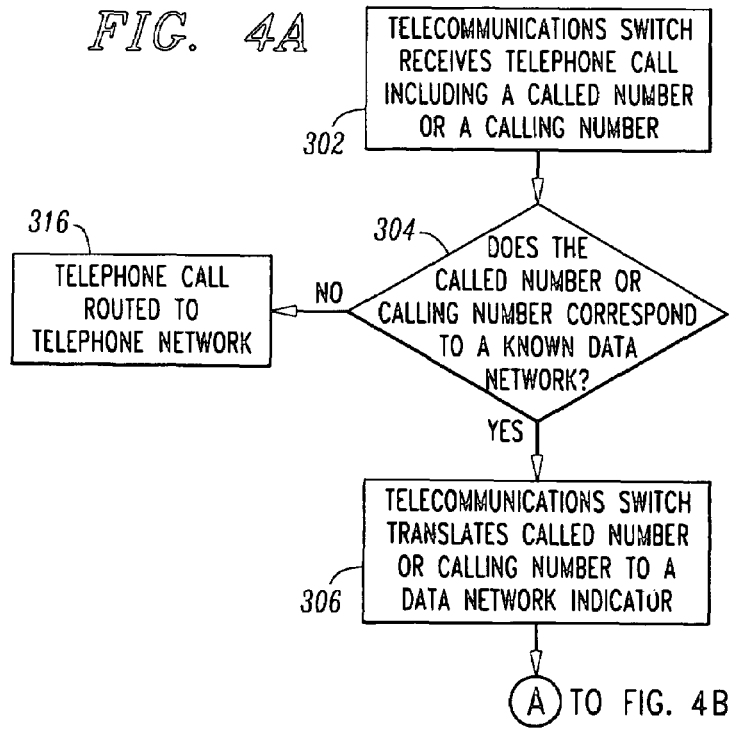

FIGS. 4A-B are a flow chart illustrating a method for packetizing data for a data network in accordance with the present invention. FIGS. 4A-B are described below with reference to system 100 in FIG. 2 and the telecommunications switch 150 in FIG. 3.

First, telecommunications switch 150 receives a telephone call made from the customer premise equipment, for example, modem 104 (302). The telephone call includes a called number and a calling number. The called number corresponds to a destination device. The calling number corresponds to the number associated with the line the call originates from, in this case, modem 104.

Next, the telecommunications switch 150 determines whether the called or calling number corresponds to a data network 118 (304). Preferably, the telecommunications switch 150 checks at least a portion of the calling number and/or called number against a list or database of calling or called numbers associated with data networks connected to the telecommunications switch 150. In particular, certain destination (called) numbers, or portions thereof, are preferably pre-subscribed in a database such that the destination numbers are correlated to known connections or addresses to data networks. Calling numbers are alternatively pre-subscribed in a database such that a call initiated from a particular calling number is directed to a default data network. If the called or calling number does not correspond to a network, the telephone call is routed to the telephone network 110 in the normal manner (316). If, on the other hand, the called or calling number corresponds to a known data network, then a data call is presumed, and switch 150 translates the called or calling number into a data network indicator (306).

The data protocol analyzer 208 determines the data protocol of the data transmission (307). Next, the data protocol terminator 210 terminates the protocol of the data transmission (308). The demodulator 214 receives the telephone call transmission and demodulates the digital information signal included therein (310).

The data network interface 216 receives the digital information signal from the demodulator 214 and generates data in a format acceptable to the data network (312). Preferably, a transmit packet of data is generated. The packetization of the transmit packet is preferably done by a packetizer 218 contained in the data network interface 216. The data network interface 216 then transmits the transmit packet into the data network 118 that corresponds to the data network indicator (314).

FIG. 5 is a flow chart illustrating a method of generating a circuit transmission from data received from a data network in accordance with the present invention. This method is used to send data to the customer premise equipment terminated on switch 150. FIG. 5 is described below in reference to system 100 of FIG. 2 and the telecommunications switch 150 in FIG. 3.

First, data from data network 118 is received by the data network interface 216 (402). Preferably, packets of data are received from data network 118. Preferably, the received data packet contains a digital information signal. The data network interface 216 depacketizes the received packet into the digital information signal (404). The data network interface 216, preferably, contains a depacketizer 220 for depacketizing the data packet. The digital information signal is then directed to the modulator 214. The modulator 214 modulates the digital information signal into a data transmission (406). The preferred modulation technique converts the digital information signal into a data transmission for transfer over a telephone call. Finally, the telecommunications switch 150 transmits the data transmission to the customer premise equipment (408). The telecommunications switch 150 preferably uses the access circuit 202 to transmit the data transmission.

As discussed herein, a telecommunications switch recognizes and processes a telephone data transmission into data or packets compatible with a data network. Advantageously, a data transmission is detected and transmitted in a data network without wasting virtual circuit resources. In particular, by diverting a data transmission at an access circuit in a telecommunications switch, a connection through a switch fabric is avoided. Also, hardware available in an access circuit is reused to effect the diversion, thereby avoiding additional hardware cost.

The invention being thus described, it will be evident that the same may be varied in many ways. Such variations are not to be regarded as a departure from the spirit and scope of the invention and all such modifications are intended to be included within the scope of the appended claims.

The invention claimed is:

1. A method for generating data for a data network with a telecommunications switch, the method comprising the steps of:
   A) receiving a telephone call;
   B) determining with the telecommunications switch whether the telephone call includes a first data transmission conforming to a predetermined data protocol, the first data transmission including a first digital information signal;
   if the telephone call includes the first data transmission conforming to the predetermined data protocol, then:

C) terminating the predetermined data protocol with the telecommunications switch; and
D) demodulating the first digital information signal from the first data transmission;
E) generating a transmit packet that includes the first digital information signal, wherein the telecommunications switch only generates the transmit packet when the first data transmission includes the first digital information signal; and
F) wherein, if the telephone call does not include the first data transmission conforming to the predetermined data protocol, then the telecommunications switch transferring the telephone call to a telephone network.

2. The method of claim 1 further comprising the step of:
G) transmitting the transmit packet into the data network.

3. The method of claim 1 further comprising the steps of:
G) receiving a receive packet from the data network, the receive packet including a second digital information signal;
H) modulating the second digital information signal into a second data transmission conforming to the predetermined data protocol; and
I) transmitting the second data transmission in the telephone call.

4. The method of claim 1 wherein a digital signal processor analyzes the telephone call to determine whether the first data transmission conforms to the predetermined data protocol.

5. The method of claim 1 wherein the predetermined data protocol is one of a modem and a facsimile protocol.

6. The method of claim 1 wherein the step of determining whether the telephone call is the first data transmission comprises determining whether one of a called number and calling number for the telephone call is a predetermined number indicating a data call.

7. The method of claim 1 further comprising the steps of:
if the telephone call includes the first data transmission conforming to the predetermined data protocol, then:
G) translating a called number for the telephone call into a data network indicator; and
H) establishing a first data connection to a data network based on the data network indicator.

8. The method of claim 7 further comprising the step of:
I) generating a transmit packet that includes the first digital information signal.

9. The method of claim 8 further comprising the step of:
J) transmitting the transmit packet into the data network.

10. The method of claim 7 further comprising the steps of:
I) receiving a receive packet from the data network, the receive packet including a second digital information signal;
J) modulating the second digital information signal into a second data transmission conforming to the predetermined data protocol;
K) transmitting the second data transmission in the telephone call.

\* \* \* \* \*